US009524176B2

(12) United States Patent
Torgerson et al.

(10) Patent No.: US 9,524,176 B2
(45) Date of Patent: *Dec. 20, 2016

(54) METHOD AND SYSTEM FOR BINDING GRAPHICAL INTERFACES TO TEXTUAL CODE

(71) Applicant: The MathWorks, Inc., Natick, MA (US)

(72) Inventors: Jay R. Torgerson, Hopkinton, MA (US); Stephen Curtis, Framingham, MA (US); Stanley Pensak, Millville, MA (US)

(73) Assignee: The MathWorks, Inc., Natick, MA (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/530,200

(22) Filed: Oct. 31, 2014

(65) Prior Publication Data
US 2015/0058745 A1    Feb. 26, 2015

Related U.S. Application Data

(63) Continuation of application No. 12/895,287, filed on Sep. 30, 2010, now Pat. No. 8,881,022.

(51) Int. Cl.
*G06F 9/44* (2006.01)
*G06F 3/01* (2006.01)
*G06F 3/048* (2013.01)

(52) U.S. Cl.
CPC ............... *G06F 9/4443* (2013.01); *G06F 3/01* (2013.01); *G06F 3/048* (2013.01)

(58) Field of Classification Search
None
See application file for complete search history.

(56) References Cited

U.S. PATENT DOCUMENTS

| 7,865,531 | B2 * | 1/2011 | Gaurav | G06F 17/30398 707/802 |
|---|---|---|---|---|
| 2007/0165031 | A1 * | 7/2007 | Gilbert | G05B 19/0426 345/473 |
| 2009/0259972 | A1 * | 10/2009 | Kodosky | G05B 19/0426 715/810 |
| 2010/0023141 | A1 * | 1/2010 | Wang | G06F 8/38 700/86 |
| 2010/0325612 | A1 * | 12/2010 | Hutchison | G06F 8/751 717/113 |

* cited by examiner

*Primary Examiner* — Tuan S Nguyen
(74) *Attorney, Agent, or Firm* — Witmer Cutler Pickering Hale and Dorr LLP

(57) ABSTRACT

In an embodiment, a method of binding a human machine interface to an expression of existing computer code may include analyzing the existing computer code to identify one or more bindable expressions in the existing computer code, and receiving a command to bind a human machine interface with one or more of the identified bindable expressions. The method may further include binding, using a processor, one or more of the bindable expressions with the human machine interface in response to the command. The binding may enable the human machine interface to communicate information within the existing computer code in place of the one or more bound expressions. The bound machine interface may communicate information within the computer code while the computer code is executing.

20 Claims, 12 Drawing Sheets

```
% Simple plotting example script toplotx = [];
toploty = [];
for x=1:100
    xp = x-50;
    yp = (xp^2)/10;
    toplotx = [toplotx, xp-50]; %#ok
    toploty = [toploty, yp]; %#ok
end figure;
ax = axes;
plot(ax, toplotx, toploty);
set(ax, 'XLimMode', 'Manual', 'XLim', [-50, 250])
```

FIG. 1

METHOD AND SYSTEM FOR BINDING GRAPHICAL INTERFACES TO TEXTUAL CODE

CROSS-REFERENCE TO RELATED APPLICATIONS

This Application is a Continuation of application Ser. No. 12/895,287 filed on Sep. 30, 2010, the disclosure of which is incorporated by reference herein in its entirety.

BRIEF DESCRIPTION OF DRAWINGS

FIG. 1 shows an exemplary section of pre-written code.

DETAILED DESCRIPTION

Much of the complexity that accompanies the development of interfaces, such as human machine interfaces (HMIs) or graphical user interfaces (GUIs), often relates to associating an underlying algorithm or code, that may define a meaning of an application, with the interface. WYSIWYG (What You See Is What You Get) graphical interface layout tools often generate a scaffolding of code that may represent a user interface definition. The scaffolding may include specific regions, often demarcated with comments, where a code developer (also referred to herein as an engineer) may add "user code."

The user code may define actions, algorithms, and a meaning of a user's application being developed by the engineer. This technique may be useful when starting from a clean slate, but it tends to assume that the user interface definition comes first and the user's code is added afterwards.

Suppose an engineer has written some code, and wants to design a simple HMI to associate with that code. The engineer may intend to use the HMI to control and/or visualize certain aspects of this existing code, in order to quickly perform experiments for exploring specific scenarios. The engineer may employ the HMI to change aspects of the code to manifest those scenarios, and to visualize results of the changes.

The HMI may be installed by manually re-writing the code, such as by adding in user interface (UI) element declarations and mapping variables/expressions of the code to properties of these UI elements. This not only takes time but can make the code less readable.

Figure 2B:
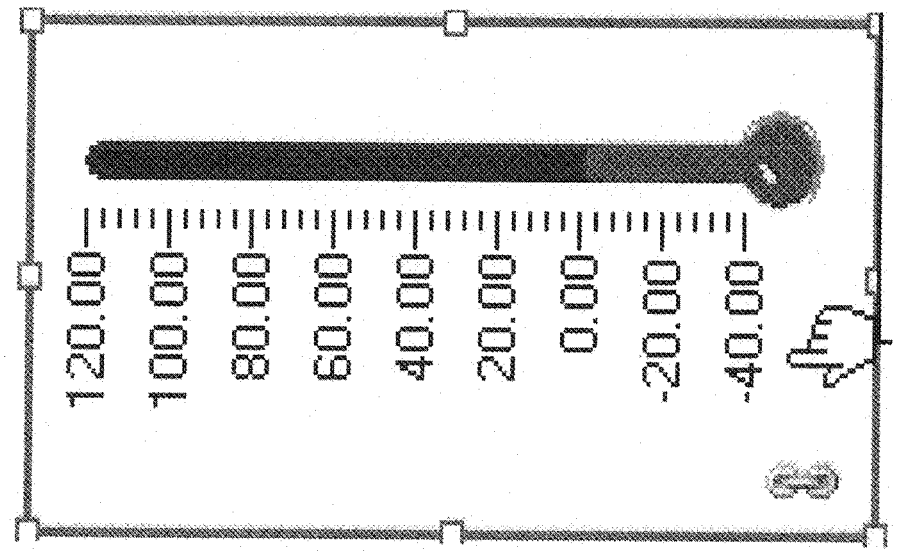
FIG. 2B shows an example of an indicator HMI.
Figure 2A:
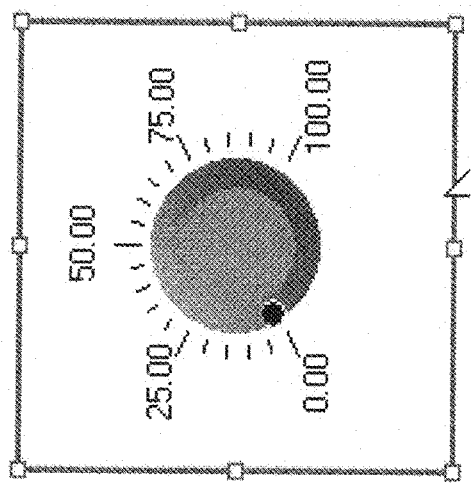
FIG. 2A shows an example of a control HMI.

The code for a simple example, shown in FIG. 1, is written in MATLAB script. The example plots dependent variable yp against independent variable xp. The engineer's goal may be to control one or more variables or other aspects of the code using an HMI such as the control knob shown in FIG. 2A, and/or to monitor one or more variables or other aspects of the code using an HMI such as the indicator shown in FIG. 2B.

Embodiments described herein may present techniques for binding an HMI element to an expression of existing computer code. The described embodiments may enable, for example, a user to intuitively provide input to and monitor information from the code during execution.

The embodiments described herein may provide a convenient way for an engineer to add HMI elements to previously-written code, in order to alter and monitor the execution of the code at run-time. Examples set forth in the following paragraphs describe how an engineer may use one or more embodiments of the invention to bind an HMI to code that has already been written. The examples demonstrate a way by which existing code may be bound to an HMI/GUI via drag-and-drop operations of expression within the code to the HMI, or from the HMI to the expression in the code.

As used herein, an HMI may be a composite entity that consists of a number of HMI elements. For example, an HMI may be depicted as a control panel layout, comprising a number of HMI elements for providing input such as knobs, switches, buttons and/or a number of HMI elements for providing feedback, such as thermometer-type indicators, meters, bar indicators, among others.

An embodiment of the invention may include a method of binding an HMI element to an expression of existing computer code, where the HMI element and/or the existing computer code may be instantiated within a GUI. The method may include analyzing the existing computer code to identify one or more bindable expressions in the existing computer code, and receiving a command to bind the human machine interface with one or more of the identified bindable expressions. The method further may include binding, using a processor, one or more of the bindable expressions with the human machine interface in response to the command. The binding may enable the HMI element to communicate information within the existing computer code in place of the one or more bound expressions.

In an embodiment, the bound HMI element may communicate information with the computer code while the computer code is, for example, executing.

In an embodiment, analyzing the existing computer code may further include evaluating an abstract syntax tree (AST) associated with the existing computer code.

In an embodiment, the command may include a drag-and-drop action.

An embodiment may include modifying a visual aspect of one or more expressions that may be identified as bindable. An embodiment may include displaying the modified visual aspect after a displayed image corresponding to a user-controlled selection tool is associated with an instantiation of one or more of the identified expressions.

The modification of the visual aspect may also indicate that the potential binding will require a conversion between the bound entities (e.g., data type=double for one entity vs. data type=integer for the other entity). The modification of the visual aspect may indicate the degree of compatibility between the bound entities. For example, a certain color (or other characteristic) may indicate that the entities are completely compatible, a second color may indicated that compatibility exists except for a conversion as described above, while a third color may indicate that the entities to be bound are completely incompatible.

In an embodiment, two or more bindable expressions may be displayed using overlapping semi-transparent highlights. One or more of the bindable expressions may be presented in a second region of the GUI, and the method may further include modifying, upon receipt of a user command, a visual aspect of the one or more of the bindable expressions presented within the second region of the GUI. The command may be received from a user-controlled selection tool and the user-controlled selection tool may be a computer mouse or a touch-sensitive display screen.

An embodiment may further include determining whether one or more of the identified expressions are incompatible with the HMI element and preventing a binding of one or more incompatible expressions with the HMI element.

An embodiment may further include binding the HMI element with at least one other HMI element. In an embodiment, the HMI element may include at least one of a button, a slide, a knob, a tree, a switch, a string entry box, a dial, a gauge, a thermometer, an image, a line or a label. In an embodiment, the bound HMI may communicate information within the computer code in place of the one or more bound expressions by, for example, providing information as a proxy for the one or more bound expressions.

In an embodiment, the bound HMI element may communicate information within the computer code in place of the one or more bound expressions by, for example, receiving information corresponding to the one or more bound expressions.

An embodiment of the invention may include a method of binding an HMI element to one or more expressions of existing computer code. The method may include instantiating the HMI within a first region of a GUI, instantiating at least the one or more expressions of existing computer code in a second region of the GUI, analyzing the existing computer code, including at least the one or more expressions, to identify one or more bindable expressions within the existing computer code, receiving a command, based on input from a user-controlled selection tool, to, for example, select the one or more expressions of existing computer code identified as bindable, and receiving a command, based on input from the user-controlled selection tool, to, for example, move the selected one or more bindable expressions from the second region of the GUI to the instantiation of the HMI element in the first region of the GUI, such that the selected one or more bindable expressions may at least partially overlap the instantiation of the HMI element within the graphical user interface. The method may further include binding, using a processor, the overlapping one or more bindable expressions with the instantiation of the HMI element, the bound HMI element may communicate information within the computer code in place of the one or more bound expressions.

An embodiment of the invention may include a method of binding an HMI element to one or more expressions of existing computer code. The method may include instantiating the HMI element within a first region of a GUI, instantiating at least the one or more expressions of existing computer code in a second region of the GUI, analyzing the existing computer code, including at least the one or more expressions, to, for example, identify one or more bindable expressions within the existing computer code, and receiving a command, based on input from a user-controlled selection tool, to, for example, select the instantiation of the HMI in the first region of the GUI. The method may include receiving a command, based on input from the user-controlled selection tool, to move the selected instantiation of the HMI element from the first region of the GUI to the one or more expressions in the second region of the GUI, such that the selected instantiation of the HMI may at least partially overlap the one or more expressions within the GUI. The method may also include binding, using a processor, the overlapping one or more expressions with the instantiation of the HMI element, the bound HMI element may be used to communicate information within the computer code in place of the one or more bound expressions.

While the embodiments above describe dragging an expression of code to an HMI element, in other embodiments the expression of code may be dragged to an HMI rather than a particular HMI element of that HMI. In that case, upon dragging the code expression to the HMI, a menu or other selection mechanism may be presented to the user indicating one or more HMI elements available for the user to choose.

An embodiment of the invention may include, a computer program product. The computer program product may be a non-transitory tangible computer readable medium having computer readable program code embodied therein. The computer readable program code may be executed to implement, for example, a method of binding an HMI element to one or more expressions of existing computer code, the medium may hold one or more instructions for analyzing the existing computer code to identify one or more bindable expressions in the existing computer code, receiving a command to bind the HMI to one or more of the identified bindable expressions, and binding, using a processor, one or more of the bindable expressions with the HMI in response to the command. The binding may enable the HMI to communicate information within the existing computer code in place of the one or more bound expressions.

An embodiment of the invention may include a computer program product. The computer program product may be a non-transitory tangible computer readable medium having computer readable program code embodied therein. The computer readable program code may be executed to implement a method of binding an HMI to one or more expressions of existing computer code, the medium may hold one or more instructions for instantiating the HMI within a first region of a GUI, instantiating at least the one or more expressions of existing computer code in a second region of the GUI, and analyzing the existing computer code, including at least the one or more expressions, to identify one or more bindable expressions within the existing computer code. The medium may further hold one or more instructions for receiving a command, based on input from a user-controlled selection tool, to select the one or more expressions of existing computer code identified as bindable, receiving a command, based on input from the user-controlled selection tool, to move the selected one or more bindable expressions from the first region of the GUI to the instantiation of the HMI in the first region of the GUI, such that the selected one or more bindable expressions at least partially overlaps the instantiation of the HMI within the GUI, and binding, using a processor, the overlapping one or more bindable expressions with the instantiation of the HMI, the bound HMI may communicate information within the computer code in place of the one or more bound expressions.

An embodiment of the invention may include a method that includes analyzing existing computer code to identify one or more expressions in the existing computer code, binding one or more of the identified expressions with an HMI. The binding may enable information to be communicated between the HMI and the existing computer code in place of the one or more bound expressions. The method may further, during an execution of the existing computer code, perform, using a processor, in place of the one or more bound expressions at least one of (1) communicate information from the HMI to the existing computer code, or (2) communicate information from the existing code to the HMI.

Figure 3:
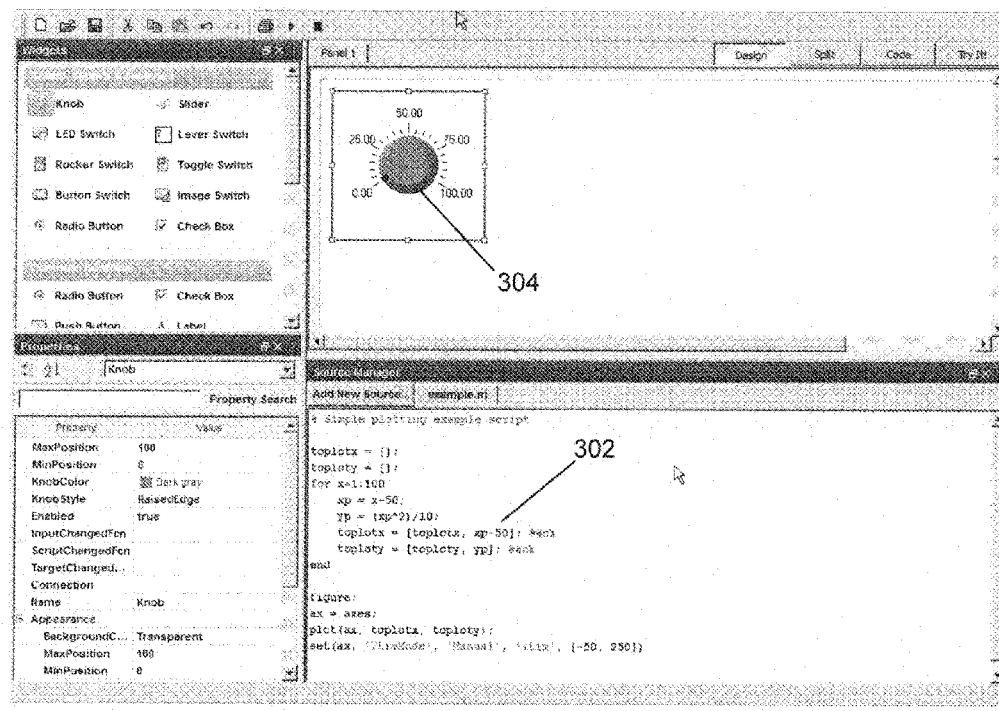
FIG. 3 shows an exemplary design environment for building HMIs.

In an illustrative embodiment, an engineer may load a MATLAB script shown in FIG. 1 into a design environment for building HMIs. Code view editor 300 shown in FIG. 3, is an example of such environment running on a computer platform. The engineer may intend to control the expression xp-50 302 with a simple knob 304 to quickly evaluate different values of that expression. The code view editor may be put into a "binding mode" via some user input, such as a keystroke, button press or mouse click. The engineer may be working in a GUI. As used herein, a GUI may be a collective term that may refer to a single display area, or multiple windows and representations.

After the code view editor 300 is in binding mode, the code view editor 300 may perform a static analysis so that locations of valid "bindable" expressions of the MATLAB code are known. In this embodiment, the analysis may be done using an AST for the MATLAB script of FIG. 1 because the exemplary code is MATLAB. Note that, a standard AST for other languages known in the art may be used if the code is written in another language (C++ or Java, for instance).

Figure 4:
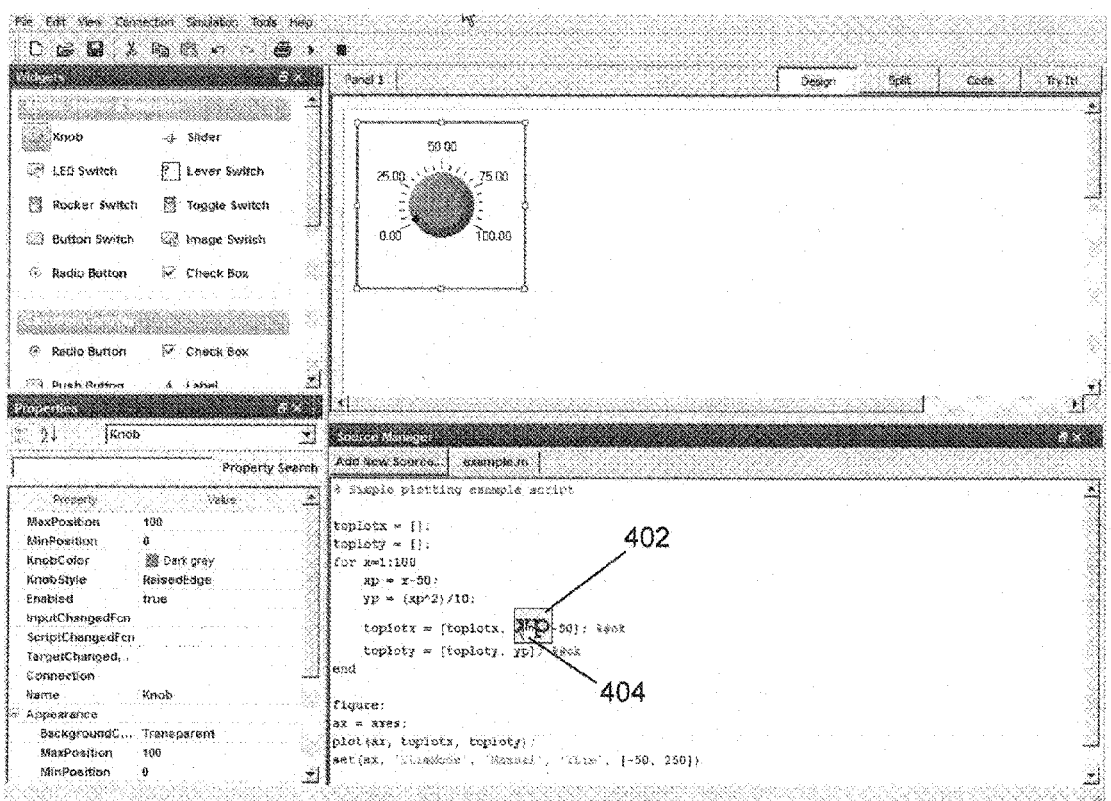
FIG. 4 shows a code view of a highlighted variable.

In the described embodiment, when the user manipulates the computer platform mouse to move the display cursor to point at a bindable variable/expression in the code view, the code display may be altered to indicate that the expression is bindable. For example, suppose that the engineer moves the display cursor over a specific declaration of the variable xp 402. In this exemplary embodiment, the resulting code view is shown in FIG. 4. As shown, the variable xp 402 is enlarged and highlighted with a shaded background. Note that other alterations to indicate that the variable is bindable may be used. For example the text or background may be colored, three dimensional effects may be used, or other effects may be used. The display cursor may be displayed as a hand cursor 404 to indicate that the highlighted section of the code can be dragged within the display.

Figure 5:
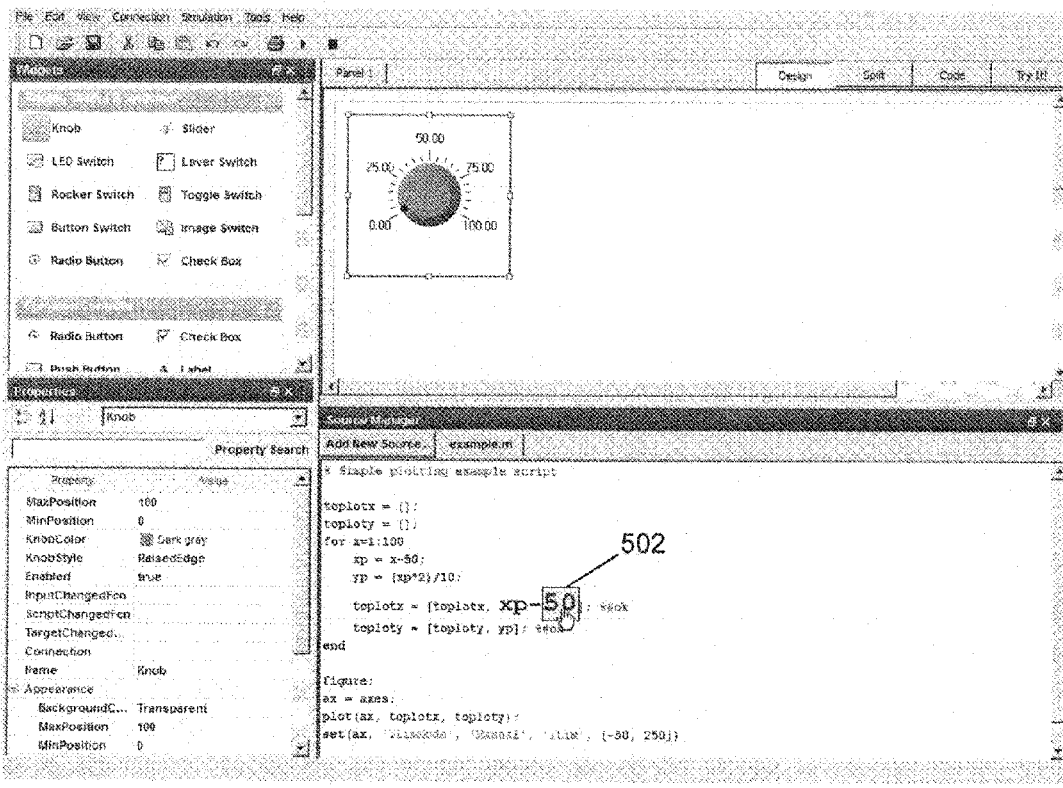
FIG. 5 shows a code view of a highlighted expression.

Moving the display cursor to the right and hovering it over the 50 expression 502 as shown in FIG. 5 similarly may cause the 50 expression 502 to be enlarged and highlighted with a shaded background, indicating that this expression is bindable.

Figure 6:
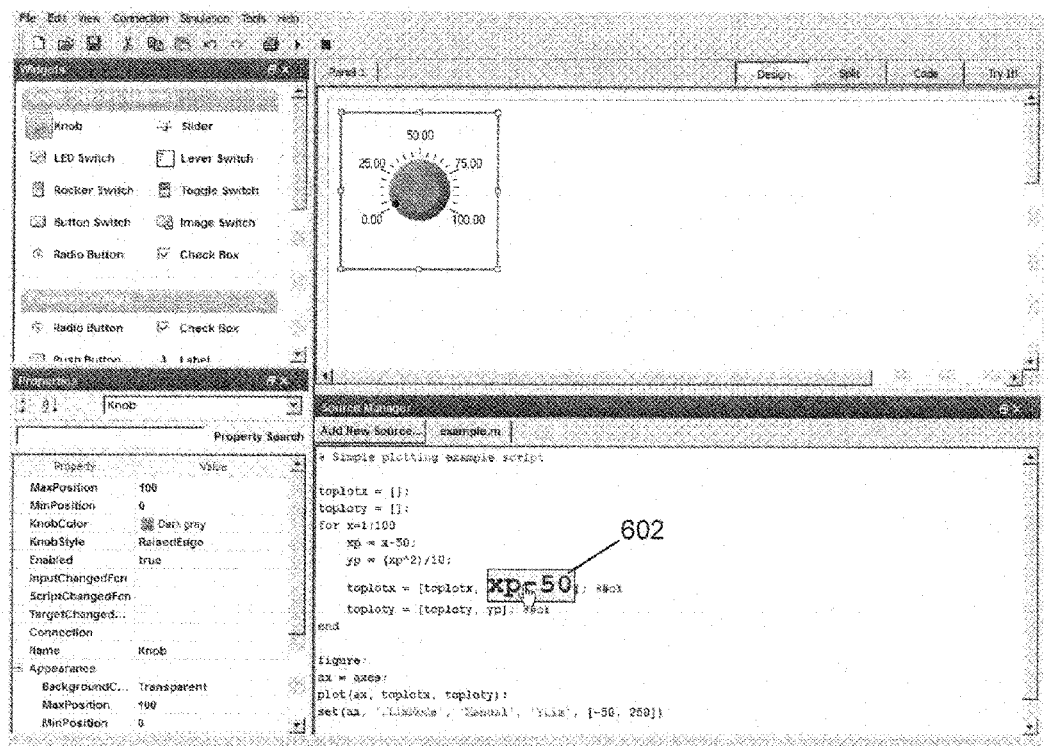
FIG. 6 shows a code view of another highlighted expression.
Figure 7:
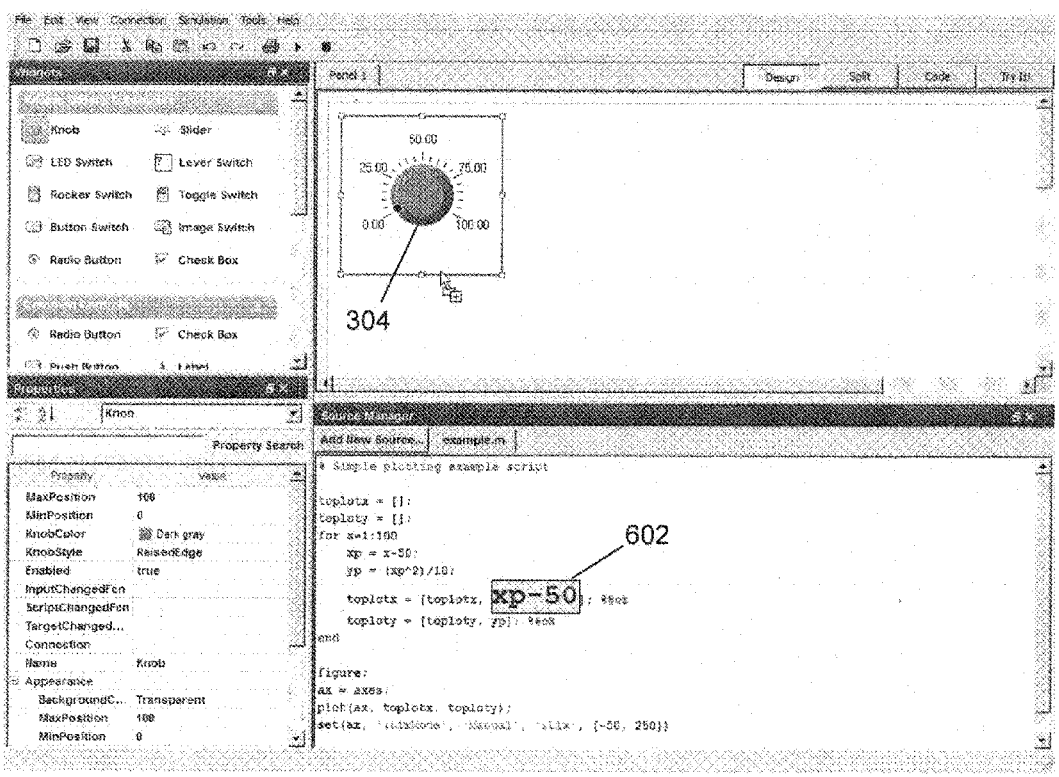
FIG. 7 shows an example of dragging and dropping an expression on an HMI.

Moving the display cursor to the middle of the xp-50 expression 602 may cause the entire expression 602 to be altered as described above for the individual items and as shown in FIG. 6. At this point the engineer may drag the highlighted xp-50 expression 602 from the code view region of the display up over the layout view region of the display and drop the expression 602 onto the knob HMI element 304 as shown in FIG. 7.

In some embodiments, moving the display cursor to be associated with an entire expression may cause a selection tool (e.g., a pop-up menu or pop-up text field) to be displayed. This selection tool may allow the user to choose a subset of the entire expression, or to modify the existing expression. The user may be required to take some action (e.g., a key press or other input) to cause the selection tool to be displayed, or the selection tool may be displayed automatically. In case of a pop-up text field, the textual content may be immediately editable or be made editable after the user takes some action (e.g., a key press or other input).

Figure 8:
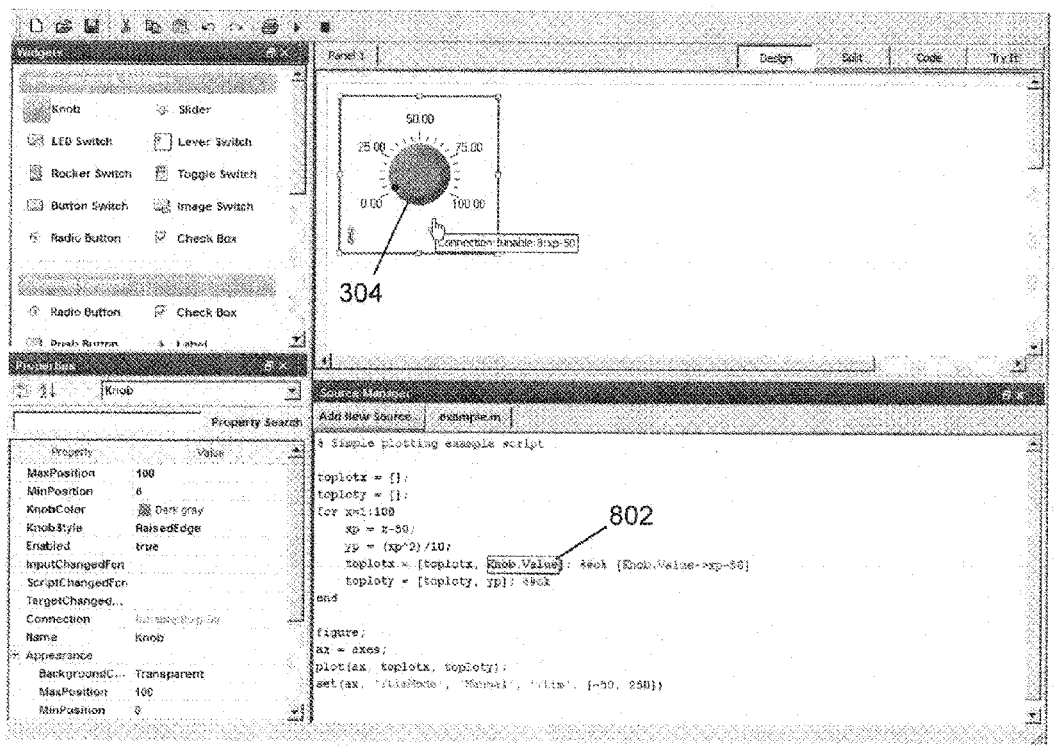
FIG. 8 shows an expression replaced with a reference to an HMI after binding.

After dropping, the knob HMI element 304 in the layout view may be "bound" to the expression in the code view as shown in FIG. 8. In the described embodiment, after the code is bound to the knob HMI element, the code may be replaced with a reference 802 to the knob. Replacing the code with the reference 802 may improve clarity.

Figure 9:
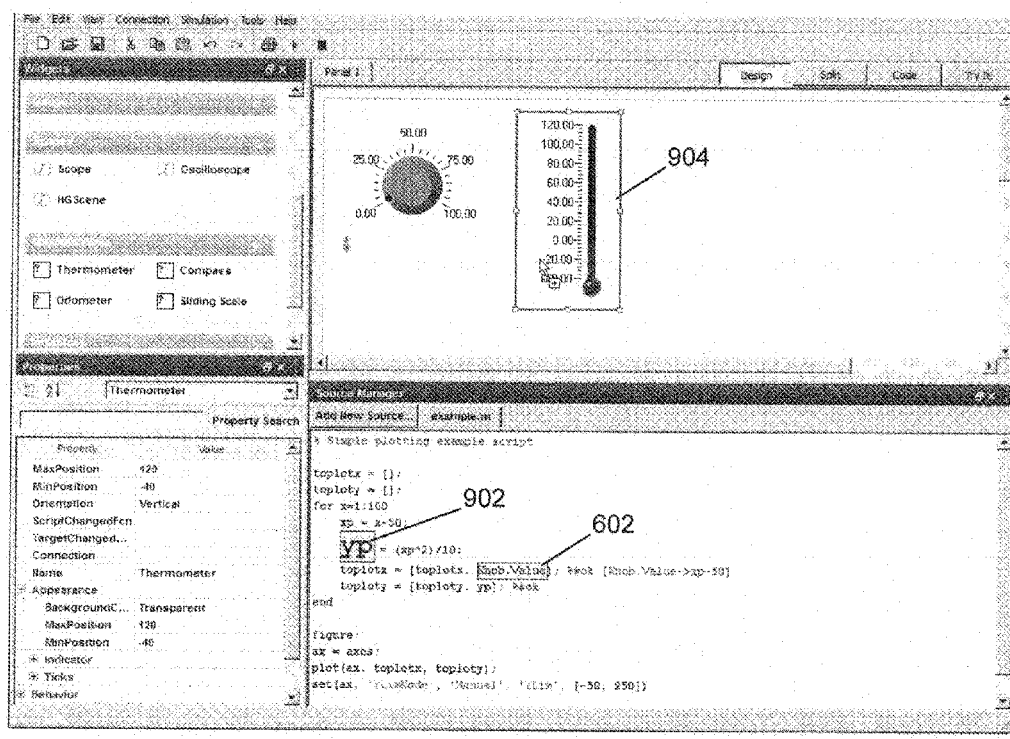
FIG. 9 shows an indicator HMI added to the code view of the design environment of FIG. 3.
Figure 10:
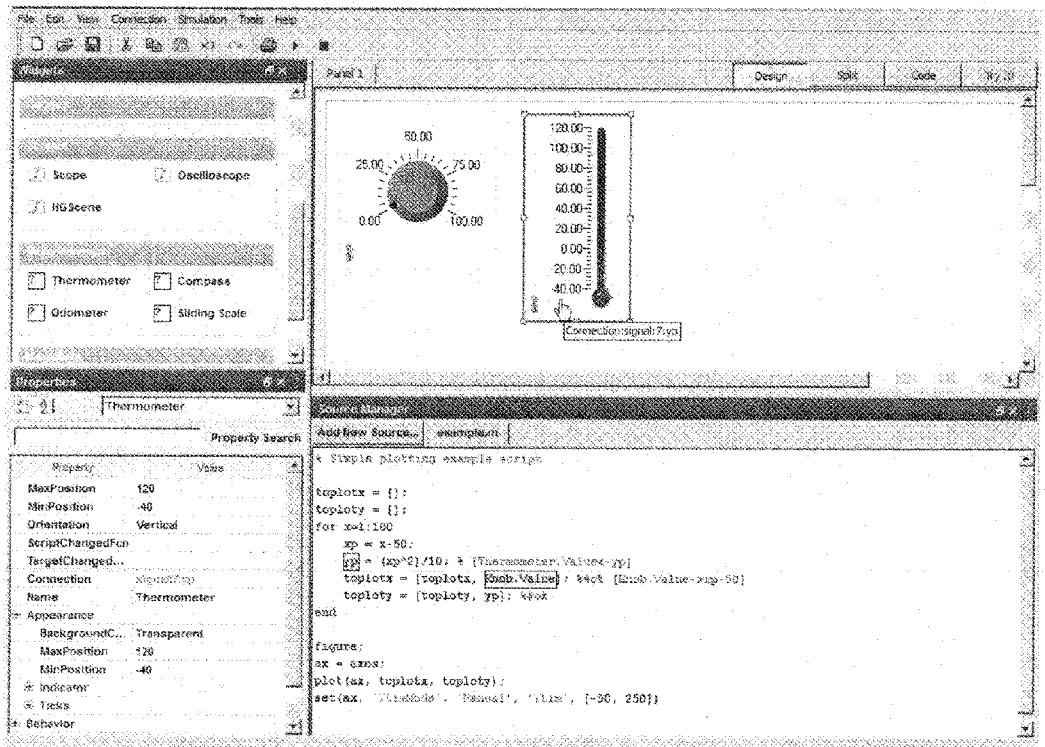
FIG. 10 shows an example of dragging and dropping an expression onto an indicator HMI.

In order to visually monitor the dependent variable yp 902 as the xp-50 expression 602 is varied, the engineer may add a thermometer style display HMI element 904 to represent the value of yp 902, as shown in FIG. 9. Dragging and dropping the expression yp 902 onto the thermometer HMI element may result in what is shown in FIG. 10. This may create "active links" (e.g., in the form of a hyperlink) between the code and the HMI element. Such an active link may be selected by the user in the code or HMI view, and automatically navigate to the corresponding HMI element that the code is bound to in the HMI view or to the corresponding code that the HMI is bound to in the code view. This may support navigating code and a structured HMI, in particular when there is hierarchy in the code and the HMI. One embodiment may show an iconic representation of the HMI element next to the bound code expression to help quickly glean what connections are present.

During execution of the exemplary code, the HMIs described above may be used to alter the bound expression in the code and visualize the results. After the play button is pressed the HMI elements may become activated and as the code is executed, the knob can be turned to alter the value representing xp-50. The thermometer may display the current value of yp. The execution of the code could be done in a loop or it could be done as a result of changing the knob state or as a consequence of external events.

An embodiment may implement an inverse of what was described above through FIGS. 3 through 10. Here, the engineer may drag the knob HMI element down over the code and drop the HMI element onto an expression, causing the HMI element and expression to be bound together. The particular expression to which the HMI element is bound will be indicated in some way. This is important in case the HMI element is large and moving it over an expression may select separate elements within that expression.

Figure 11:
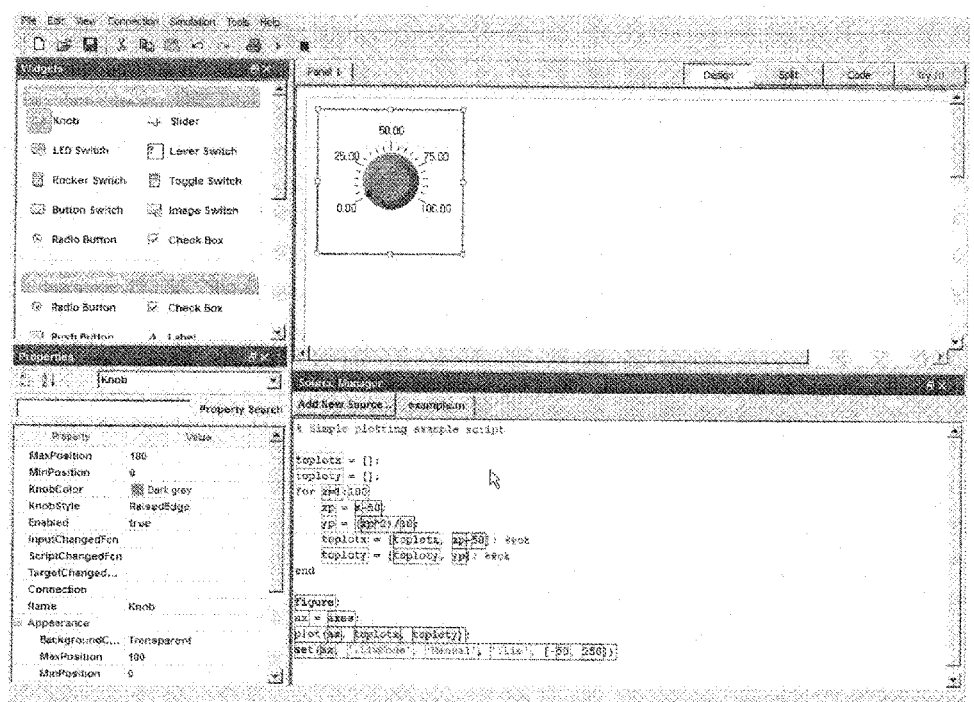
FIG. 11 shows an example of all bindable expressions within a code view being indicated.

Note that "bindable" expressions may be visualized. The engineer may wish to see all bindable expressions in a given section of code at the same time. In one or more embodiments, a user action (e.g., keystroke, button press, mouse gesture, etc.) may be used to visually identify bindable expressions, for example as shown in FIG. 11.

Using transparency of the highlighting may enable overlapping expressions to be visible. This technique may reduce an amount of trial-and-error probing, that may be performed to identify bindable expressions within the code, by clearly delineating the bindable expressions.

The kinds of expressions that are bindable may depend on the textual language and on the type of HMI one is trying to bind. The visualization of the bindable expressions in the target code may be altered as a function of the type of HMI element that is being bound. For instance, a knob HMI may bind to an expression whose output is numeric; whereas an edit field HMI may be used to control a string expression, and a checkbox may be used to control an expression whose result is a Boolean value. Likewise, in some embodiments drop-down and/or pop-up arrangements may be used to bind to enumerations.

In some embodiments, a determination of whether an expression is bindable may also be based on the range of numerical values that the expression may assume during execution. The range may be dependent on associated attributes such as design minimum/maximum, as well as its data type (e.g., range of Boolean or fixed point slope/bias configuration). The range may also be determined based on analysis of run-time characteristics of the code, for example, by abstract interpretation.

The enumeration case may pose an issue because certain information may not yet exist. For example, if at the time of binding, the definition of the enumeration is not known (e.g., all possible values are not explicitly defined but perhaps derived at run-time), the engineer should be able to assist the system by entering a best guess. Although submitting a best guess could produce runtime errors, in most cases such input may be accepted without incident and may generally improve execution.

Table I below presents a list of possible binding mappings between HMIs and expression result types. Note that this list is illustrative and is not intended to be limiting.

TABLE I

| HMI | Expression Result Type |
| --- | --- |
| Knob | Numeric value (could be integer, float, double, etc.) |
| Edit field | String |
| Checkbox | Boolean value (true or false, 0 or 1, etc.) |
| Popup/dropdown | Enumerated values (exclusive) |
| Radio button | Enumerated values (exclusive) |
| Label | Any value that can be converted to a string representation. |
| Dial/Guage (Thermometer) | Numeric value (typically) |

The binding of an expression to an HMI may be done at a property level of the HMI. For instance, suppose the knob HMI in the above example has a title and a value that are exposed as a properties of the knob. The engineer could bind the "title" property of the knob to an expression in the code, the resultant type of which is "string," and the "value" property of the knob to an expression in the code that represents a numeric value.

When binding HMI elements to existing code, some of the expressions which may be bound may also represent entire functions (also know as methods, procedures, etc.). For example, a user may wish to bind an HMI element (e.g., a button) in the HMI to call a certain pre-defined method in some existing code such as following:

```
% some algorithm code
x = someFunction(43);
y = sin(x)-50;
z = myFunction(x,y);
% my function specified here (could be in the same file a
la MATLAB)
function y = myFunction (a, b)
   y = 5*sqrt (a^2 + b^2) ;
end
```

Assume that the function (or method) to be called in the code is referred to as myFunction. The binding techniques described herein may be used to quickly bind an HMI element such as a "Dial" to the input symbol a of myFunction in the existing code. Similarly, an second "Dial" HMI element is bound to the input symbol b of myFunction, The symbol myFunction is further bound to a Button HMI element in the HMI and the output symbol y is bound to a "plotting" HMI element in the HMI. As the user turns the dials corresponding to a and b, different inputs are established for the function myFunction. When the user actuates the Button HMI element, the function myFunction is called with the input values specified by the dials and the plot element shows the resulting value. This exemplary code may all be in one file or distributed across many files.

Furthermore, a single HMI property may, in certain cases, be bound to an expression universally, rather than on an instance-by-instance basis. For example, the knob HMI of the example described above may be bound to multiple instances of the expression xp throughout the code rather than a single instance of xp-50. In the code sample of FIG. 1 there are two lines that refer to xp. The knob HMI can therefore be bound to either one or more of these references to xp. After the engineer turns the knob HMI, all bound locations of xp may acquire the new value defined by the HMI. In general, the described embodiments may encompass many-to-many bindings between HMI properties and expressions.

Embodiments described herein can be implemented on various types of computer systems (e.g., desktop, laptop or notebook PC, mobile handheld computing system or workstation). Described embodiments may be implemented in a computer program product that may be non-transitory and may be tangibly embodied in a machine-readable storage medium for execution by the computer system. Methods of described embodiments may be performed by a computer system executing a program to perform functions, described herein, by for example, operating on input data and/or generating output.

Figure 12:
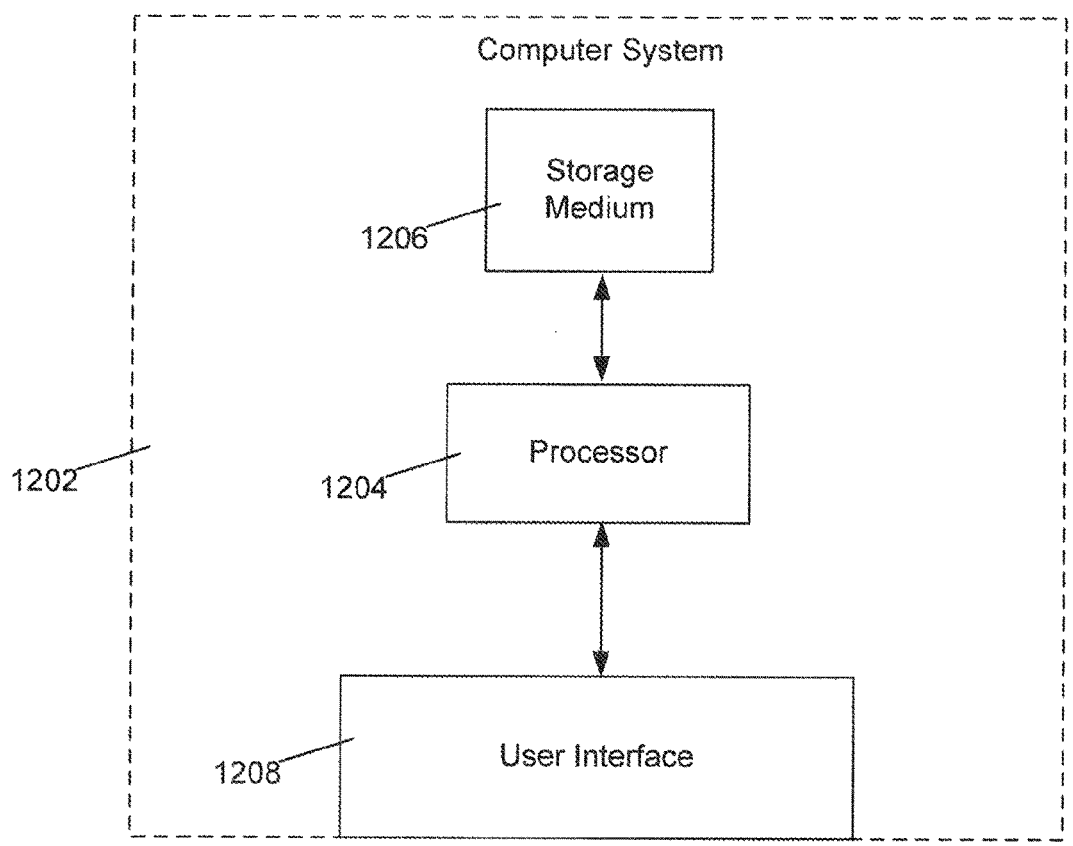
FIG. 12 shows an exemplary computer system suitable for implementing the described embodiments.

An exemplary computer system 1202 is shown in FIG. 12. Referring to FIG. 12, computer system 1202 may include a processor 1204, an information storage medium 1206, and a user interface 1208. These components may be contained within a typical desktop, laptop or mobile form factor housing, or they may be integrated into a single component such as a multi-chip module or ASIC (application specific integrated circuit).

Suitable processors 1204 may include, for example, both general and special purpose microprocessors. Generally, the processor 1204 receives instructions and data from a read-only memory (ROM) and/or a random access memory (RAM) through a CPU bus. The processor 1204 may also receive programs and data from a storage medium 1206, such as, for example, an internal disk operating through a mass storage interface, or a removable disk operating through an I/O interface. Instructions for executing the described embodiments may be stored on the storage medium.

Information storage media 1206 suitable for tangibly embodying computer program instructions for implementing the described embodiments may include various forms of volatile memory and/or non-volatile memory, including but not limited to, semiconductor memory devices, such as EPROM, EEPROM, and flash memory devices, and magnetic disks, such as internal hard disks and removable disks, magneto-optical disks, and CD-ROM disks. The information storage medium 1206 may also store an operating system ("OS"), such as Windows or Linux, which the processor may execute to provide, for example, a supervisory working environment for the user to execute and control, for example, one or more embodiments of the invention.

The user interface 1208 may include a keyboard, mouse, stylus, microphone, trackball, touch-sensitive screen, or other input device. These elements are typically found in a conventional desktop computer as well as other computers and workstations suitable for executing computer programs implementing methods described herein. The computer system 1202 may also be used in conjunction with a display device for providing a GUI. The display device may include an output device that may be capable of producing color or gray scale pixels on paper, film, display screen, or other output medium.

The touch-sensitive screen described above may be used to effect a multi-point input interface. For example, the user may sequentially or simultaneously select items in the GUI using two or more fingers.

Referring to the examples presented herein, rather than selecting an expression with a mouse-controlled display curser and dragging the expression to the HMI element to effect the binding, the user may select the expression by touching its corresponding location on the screen with one finger and select the HMI element by touching its corresponding location on the screen with another finger to effect the binding.

The described embodiments are not limited to an implementation that is contained within a single platform. The described embodiments may also be suitable for use in a distributed computing environment or in an environment of computing devices communicating through a network or other linked architecture. For example, a user may utilize functionality in a mobile device that enables the mobile device to communicate and cooperate wirelessly with a workstation. The user may employ the concepts of the described embodiments to bind an entity displayed on the mobile device (e.g., an HMI element) with an entity displayed on the workstation (e.g., an expression from a piece of code) by selecting those entities as displayed on their respective output devices (e.g., screens). For example, the selection may be accomplished by touching the respective screens with a finger from each of the user's hands.

The foregoing description of embodiments is intended to provide illustration and description, but is not intended to be exhaustive or to limit the invention to the precise form disclosed. Modifications and variations are possible in light of the above teachings or may be acquired from a practice of the invention. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a processor, such as processor 1204. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
analyzing, by one or more processors, displayed computer code to identify one or more bindable expressions in the displayed computer code that are bindable with elements of a human machine interface (HMI);
receiving, by the one or more processors, a command to bind one or more of the elements of the HMI with one or more of the identified bindable expressions; and
binding, by the one or more processors, one or more of the identified bindable expressions with one or more of the bindable elements of the HMI in response to the command, the binding enabling bidirectional communication of information between the one or more bound elements of the HMI and the one or more bound expressions.

2. The method of claim 1 further comprising modifying the one or more bound expressions in response to a modification of the one or more bound elements of the HMI.

3. The method of claim 1 further comprising controlling the one or more bound expressions in response to a modification of the one or more bound elements of the HMI.

4. The method of claim 1 further comprising altering the execution of the displayed computer code at run-time in response to a modification of the one or more bound elements of the HMI.

5. The method of claim 1 further comprising modifying the one or more bound elements of the HMI in response to a modification of the one or more bound expressions.

6. The method of claim 1 wherein the binding enables the one or more bound elements of the HMI to communicate information within the displayed computer code in place of the one or more bound expressions.

7. The method of claim 1, wherein the command identifies the one or more elements within the HMI to be bound to one or more of the identified bindable expressions.

8. The method of claim 1, wherein the command identifies one or more of the identified bindable expressions to be bound to the one or more elements of the HMI.

9. The method of claim 1, wherein the binding further comprises enabling modification of the one or more bound elements of the HMI to modify the one or more bound expressions.

10. The method of claim 1 further comprising communicating information within the displayed computer code in place of the one or more bound expressions by providing information as a proxy for the one or more bound expressions.

11. A non-transitory computer readable storage medium that includes computer-executable instructions that, when executed by a processor, cause the processor to:

analyze displayed computer code to identify one or more bindable expressions in the displayed computer code that are bindable with elements of a human machine interface (HMI);

receive a command to bind one or more of the elements of the HMI with one or more of the identified bindable expressions; and bind one or more of the identified bindable expressions with one or more of the bindable elements of the HMI in response to the command, the binding enabling the bidirectional communication of information between the one or more bound elements of the HMI and the one or more bound expressions.

12. The non-transitory computer readable storage medium of claim 11, wherein the instructions are further configured to cause the processor to modify the one or more bound expressions in response to a modification of the one or more bound elements of the HMI.

13. The non-transitory computer readable storage medium of claim 11, wherein the instructions are further configured to cause the processor to control the one or more bound expressions in response to a modification of the one or more bound elements of the HMI.

14. The non-transitory computer readable storage medium of claim 11, wherein the instructions are further configured to cause the processor to alter the execution of the displayed computer code at run-time in response to a modification of the one or more bound elements of the HMI.

15. The non-transitory computer readable storage medium of claim 11, wherein the instructions are further configured to cause the processor to modify the one or more bound elements of the HMI in response to a modification of the one or more bound expressions.

16. The non-transitory computer readable storage medium of claim 11, wherein the instructions are further configured to cause the processor to enable the one or more bound elements of the HMI to communicate information within the displayed computer code in place of the one or more bound expressions.

17. The non-transitory computer readable storage medium of claim 11, wherein the instructions are further configured to cause the processor to identify the one or more elements within the HMI to be bound to one or more of the identified bindable expressions.

18. The non-transitory computer readable storage medium of claim 11, wherein the instructions are further configured to cause the processor to identify one or more of the identified bindable expressions to be bound to the one or more elements of the HMI.

19. The non-transitory computer readable storage medium of claim 11, wherein the instructions are further configured such that the binding further comprises enabling modification of the bound elements of the HMI to modify the one or more bound expressions.

20. The non-transitory computer readable storage medium of claim 11, wherein the instructions are further configured to cause the processor to communicate information within the displayed computer code in place of the one or more bound expressions by providing information as a proxy for the one or more bound expressions.

* * * * *